United States Patent [19]

Lerner

[11] Patent Number: 5,024,686
[45] Date of Patent: Jun. 18, 1991

[54] RECYCLE SPRAY GAS-LIQUID CONTACTOR

[76] Inventor: Bernard J. Lerner, 727 Orchard Hill Dr., Pittsburgh, Pa. 15238

[21] Appl. No.: 512,214

[22] Filed: Apr. 20, 1990

[51] Int. Cl.$^5$ .............................................. B01D 47/00
[52] U.S. Cl. ...................................... 55/259; 261/118; 261/DIG. 54
[58] Field of Search ................... 55/233, 259; 261/118, 261/DIG. 54

[56] References Cited

U.S. PATENT DOCUMENTS 3,616,604  11/1971  Schouw ................................ 55/259
4,732,585   3/1988  Lerner ...................................... 55/90

Primary Examiner—Bernard Nozick
Attorney, Agent, or Firm—Olin E. Williams

[57] ABSTRACT

This invention relates to a novel gas-liquid contacting apparatus and method utilizing recycle spray contact trays disposed within a substantially vertical vessel. Each contact tray contains one or more housings defined by upstanding vertical wall members, said housings being open to gas flow at top and bottom. Within the housings, liquid spray is continuously generated by means of gas flowing upward past a first array of spaced-apart gas venturi-generating liquid conductors. Liquid flows from the tray floor outside the housing through the liquid conductors, is distributed into the gas, and is entrained upward as spray by the gas venturi action. The major apart of the liquid spray is captured by an array of horizontal open-ended foraminous or perforated tubes, in substantial side-by-side contact with each other. The spray issuing laterally from the tubes impinges on the vessel walls and liquid therefrom drains downward or falls by gravity to the tray floor, where the process is repeated. The method of invention encompasses spray contacting with automatic and continuous recirculation of liquid spray in a controlled manner at rates that are multiples of the liquid throughput rate, and is capable of operation at high gas velocities and low pressure drop.

13 Claims, 2 Drawing Sheets

RECYCLE SPRAY GAS-LIQUID CONTACTOR

FIELD OF THE INVENTION

This invention relates to method and apparatus for improved gas-liquid contacting and mass transfer and in particular provides for multiple cocurrent gas-liquid spray contacts under net countercurrent gas/liquid flow conditions, with continuous spray generation, liquid collection and recycle, solely by means of gas flow and without the intervention of external mechanical means. Still more particularly, this invention relates to apparatus and method for obtaining liquid spray recirculation rates that are multiples of tray liquid throughput rates, said method and apparatus being capable of operation at high gas velocities with low pressure drop.

BACKGROUND OF THE INVENTION

Countercurrent mass transfer methods, such as distillation or absorption, are normally carried out in apparatus employing liquid gravity downflow or crossflow in contact with an upward flow of gas. Conventionally, such contact is carried out either stagewise, employing a variety of liquid-gas contacting trays, or in so-called differential contacting equipment, such as packed towers.

A large variety of contacting trays are known to the art, mainly comprising bubble cap or sieve trays, wherein liquid flows horizontally across each contact tray in crossflow relation to the gas flowing generally vertically upward through the tray. In such conventional contacting trays, intimate gas-liquid contact is secured by bubbling the gas through the liquid on the tray and generating a bubble froth.

On conventional bubble-cap and sieve trays, liquid droplet spray or entrainment is known to be incidentally generated. Such spray carryover is known in the art as "liquid-in-gas" entrainment. This entrainment is considered to be undesirable in stage wise, countercurrent, liquid-gas contact, because spray carryover of liquid from one tray to the contact tray above short-circuits the desired progression of tray-to-tray liquid/gas concentration gradients. The prior art has attempted to solve this problem in various ways. For example, Kiselev, in U.S. Pat. No. 4,820,456, uses perforated plate froth retainer cells to generate a fine foam in order to blanket the turbulent liquid and inhibit entrainment carryover to the tray above.

In some mass transfer methods, where a significant portion of the total transfer resistance lies in the liquid phase, spray contacting may be desirable. Examples of such processes include the de-aeration of boiler feed water, stripping of volatile organic contaminants from contaminated water and absorption of highly-soluble gases. These, and other similar processes, are characterized by the fact that the overall transfer rate is controlled by liquid-phase or liquid-film diffusion rates, which are intrinsically slower than gas-phase diffusion rates. The minimization of such resistance requires the maximum degree of continuous mixing of the liquid phase. However, spray contactors do not normally provide for optimum or continuous mixing of the liquid phase, and therefore have not been widely used industrially for gas-liquid mass transfer operations.

In a spray contactor, the major fraction of the total mass transfer of a solute from a gas to a liquid, or from the liquid to the gas, occurs during drop formation in the vicinity of the spray nozzles. During drop formation, the liquid is in generally turbulent sheet or jet flow. Once the liquid drops are formed, they mix internally by oscillation for a brief period and subsequently behave more or less like rigid spheres, with no further internal mixing. Within a liquid drop, liquid phase transfer in the absence of internal mixing is a slow diffusion-controlled process which yields very low overall transfer rates. This absence of internal stirring or mixing following drop formation is one of the major disadvantages of conventional single-stage spray contact devices.

One method of achieving liquid mixing following the formation of liquid drops is to collect, or coalesce, the drops into bulk liquid form and then reform the drops. Prior art methods for drop collection and spray regeneration have generally involved some external mechanical device, such as a recycle pump and spray nozzles. Mechanical pumping to secure spray regeneration is energy-intensive and is not economical where a number of contact stages is required.

Such prior art spray contactors that rely on mechanical means of controlled spray liquid capture and recycle include Herrlander, U.S. Pat. No. 4,514,196, which utilizes a contact tray containing a plurality of separate venturi tubes with a spider-arm liquid distributor, with one liquid tube feeding each individual venturi. The gas venturis generate upward liquid spray. The liquid spray is intercepted by a bed of balls where secondary bubble flow contacting is secured. There is no internal recycle of liquid; passage of liquid is essentially once-through. In another example, Ekman, U.S. Pat. No. 3,795,486, teaches the use of a series of spaced-apart cylindrical rods with spray injected either from above or below into vertical gas upflow. The flow of liquid is "downwardly counter-current" to gas flow through the vessel containing the series of spaced-apart rods. The combination of rod spacing and gas velocities used by. Ekman yields downward cascading of liquid through the rod arrays and generally countercurrent liquid/gas flow. Andersen, U.S. Pat. No. 3,447,287, effects once-through passage of smoke and spray through an array of rods in order to obtain particulate collection. In Ekman, U.S. Pat. No. 4,140,501, gas flows horizontally through a single row of spaced-apart vertical or inclined venturi-forming tubes. The tube array is face-sprayed by an upstream spray nozzle cocurrent with gas flow, and the spray which is entrained downstream is removed by a series of progressively finer vane demisters. Demisted liquid is drained from the system, and there is no teaching in Ekman of liquid recycle. In all of these cases of the prior art, liquid spray generation and/or collection is random and uncontrolled other than by gravity. There is no means provided for control of, or internal recycle of, the spray liquid. In neither Ekman or Andersen is there any teaching of a method or means for internal spray collection, directed external flow and automatic regeneration of spray recycle of liquid in a controlled, repeated, manner.

In Lerner, 4,732,585, spaced-apart perforated or foraminous tubes, closed at the ends, are used in a baffle-and-tube array to cause liquid in the tubes to go into bubbling flow. Gas-liquid contacting is by means of bubbling flow, with spray injected above the array, and liquid draining downward from the bubble tubes. Lerner provides no method or means for internally-controlled liquid recycle and spray regeneration.

OBJECT OF THE INVENTION

It is the object of this invention to provide an improved method and apparatus for gas-liquid contacting. It is another object of this invention to provide a liquid-spray gas-liquid contact apparatus of increased efficiency, wherein the spray is continuously generated and is cocurrently contacted by the gas, and is collected as liquid, recycled and regenerated in a controlled manner. It is still a further object of this invention to generate spray, cocurrently contact gas therewith, and to collect, recycle and regenerate spray on one or more contact trays, arranged in series, using only the gas flow energy for spray generation, capture and recycle. It is a further object of this invention to generate spray on the contact tray or trays at spray rates that are multiples of the liquid feed rate through the tray or tower containing a plurality of trays, It is still a further object of this invention to provide an effective apparatus for, and method of, cocurrent gas-liquid spray contacting, under net countercurrent stage-wise gas/liquid flow conditions, that are capable of operating at high gas velocity and low pressure drop.

SUMMARY OF THE INVENTION

The method of the present invention is carried out in a substantially vertical vessel containing one or more gas-liquid contact trays. Each contact tray is comprised of a substantially horizontal plate with upstanding wall members fastened to the plate, said wall members defining within said vessel one or more vertically-walled housings open to the upflowing gas at both top and bottom. The housing contains a first or bottom array of horizontally-disposed, spaced-apart parallel liquid conductors open at one or both ends, which penetrate the vertical walls of the housing and communicate with a liquid layer on the tray floor external to said housing The said conductor tubes are preferably cylindrical or tubular, or sections thereof, and are so spaced apart as to generate venturi flow in the upflowing gas passing through the internal box formed by the walled housing, and through the array of said liquid-conducting tubes. The said liquid-conducting venturi tubes contain suitable distributor means for uniformly dispersing the liquid in the gas venturi flow formed external to the tubes In the method of this invention, the gas is caused to flow at sufficiently high velocities through the housing to both generate spray at the areas of introduction of liquid from said liquid-conductors, acting also as venturi-generating tubes, and to entrain upwardly substantially all of the spray so formed.

The spray conveyed cocurrently upward by the gas flow is intercepted by an array of perforated or foraminous hollow spray interceptor tubes which are open at one or both ends, and are contiguously arranged, preferably in substantial contact with one another. It has been discovered that, surprisingly, when one or both ends of the foraminous spray interceptor tubes are open to the volume external to the housing containing the tubes, a significant fraction of the gas flow by-passes laterally through the tubes to and through the open ends. Further, it is observed that that portion of the gas stream that flows horizontally through the spray interceptor tubes carries the major portion of the spray into the space between the vertical walled housing and the outer cylinder. Pressure drop measurements have shown that the lateral conduction of the gas through the foraminous tubes is induced because the ga pressure differential across the interceptor tube bank in the direction of vertical gas flow is greater than the pressure differential between the gas at a point upstream of the row of foraminous tubes and the gas inside of the tubes. The static pressure inside the interceptor tubes is lower than the gas pressure upstream of the foraminous tube bank, because of the fact that the tubes are in a contiguous array and the gas has to traverse both the upstream and downstream faces of the foraminous tube bank. Because of the pressure gradient established across the tube bank, the pressure inside the tubes is higher than the pressure in the external box volume by an amount equal to the pressure drop across the downstream faces of the foraminous tubes. Therefore, a significant portion of the gas is caused to take the path of least resistance and flow initially through the foraminous tube perforations, or openings, to the interior of the tube and then horizontally through the tube to the tower shell volume external to the vertical housing.

The optimum degree of lateral flow in the foraminous tubes is obtained when the tubes are arranged alongside one another, that is, parallel and in substantial contact with each other. The intercepted spray is ejected along with the gas flow through the tubes normal to the initial spray direction developed by the gas venturi action at the liquid-conductor tubes. The horizontally-ejected spray falls by gravity or is caught by the walls of the cylindrical vessel and the liquid therefrom drains to the liquid pool on the floor of the tray where it re-enters the liquid-conducting tubes on the tray floor and is thus caused to recycle. This invention thus provides a cycle of continuous spray generation, re-direction of the spray normal to the gas flow direction, collection of the laterally-moving spray on the vessel walls or on special vertical collection plates, collection of the liquid by gravity drainage, and regeneration of spray from the recycled liquid. Although liquid flow is countercurrent to the gas flow in the column, gas/liquid spray contact is entirely cocurrent within the walled housing on the contact tray and liquid recycles on the tray in a closed-loop manner. The liquid spray cycle on the tray may be compared to an internal flywheel, with the net flow from plate to plate being the throughput liquid rate.

To secure both the initial entrainment and the reentrainment of recycle liquor, the recycle liquid conductors of the assembly are preferably comprised of cylinders or cylindrical sections so spaced-apart as to generate a venturi effect in the gas stream flowing between them sufficiently large to aspirate liquid introduced to the gas in the upward direction. The liquid conductor/-gas venturi-forming tubes may be open half-tubes or troughs from which liquid overflows by weir action into the gas venturi streams passing between them, thus allowing liquid spray to be aspirated upward by means of the gas venturi action. Alternatively, the venturi feed tubes may be fully cylindrical tubes with perforations, weirs, slots, nozzles, or other means known to the art for overflowing or injecting liquid. To maximize spray generation, the means of liquid feed into the gas is preferably so arranged as to feed liquid into the gas stream in a direction substantially normal to the gas flow.

The spray collection and redirection cylinders may be of perforated or foraminous construction (wire mesh, expanded metal or plastic, screen, lattices, perforated tube or pipe, and the like) having from 25 to 90% open area, and preferably from 40 to 80% open area. For relatively large trays, or for multi-compartment trays, the spray collection cylinders are preferably closed at one end, causing gas flow and liquid ejection from the opposite end. Such closed-end cylinders may be oriented all in one direction, so that the liquid flow ejects all in one direction, or the closed end of the cylinders may be alternated, causing simultaneous ejecta flow to opposite sides of the housing.

The foraminous spray collection and redirection tubes are most advantageously oriented with respect to the liquid flow across the tray floor so as to secure the highest degree of liquid recycle and retention time on the tray, that is, the least degree of short-circuiting of the laterally-directed spray to the liquid overflowing to the tray below. For example, when liquid is introduced to the tray floor on one side of the tray, and the downcomer is 180° from the liquid entry, with the liquid conducting tubes arranged parallel to the general liquid flow direction, the spray collection-recycle cylinders may advantageously be placed at substantially right angles to the venturi-generating liquid conductor tubes. Alternatively, the degree of liquid recycle may be maximized and the extent of liquid short-circuiting to the tray overflow may be minimized by placing both the venturi tubes and foraminous spray tubes at right angles to the liquid flow direction on the tray from the feed weir to the downcomer. In this latter case, the venturi tubes are parallel to the foraminous tubes. If it is desired to recycle the spray directly back to the venturi tube liquid inlet side, the foraminous cylinders may be aligned parallel to the liquid-conducting venturi tubes, and closed off on the end of the housing on the side of the downcomers to the tray below. In those cases where a cross-flow liquid gradient is desired, multiple vertical compartments may comprise the tray contacting means, with directed liquid ejection from the foraminous spray collecting cylinders to the upstream side of net liquid flow across the tray, or to the 90°/270° sides of the flow direction across the tray.

The liquid-conducting tubes are preferably located at or near the tray floor, and the liquid level on the tray is maintained at sufficient depth to cause the liquid to flow through the tubes at a desired rate. The liquid level may be maintained at the desired levels by conventional means such as an overflow pipe or weir downcomer. If fully submerged liquid conducting tubes are employed, it is preferable to have flow-restrictive liquid introduction means such as slots or orifices, so that the liquid rate of introduction to the gas may be controlled by means of the external hydrostatic head on the tray.

BRIEF DESCRIPTION OF THE DRAWINGS

A preferred embodiment of this invention, both as to apparatus and the method of its operation is described with reference to the drawings, of which.

DETAILED DESCRIPTION OF THE DRAWINGS

Figure 1:
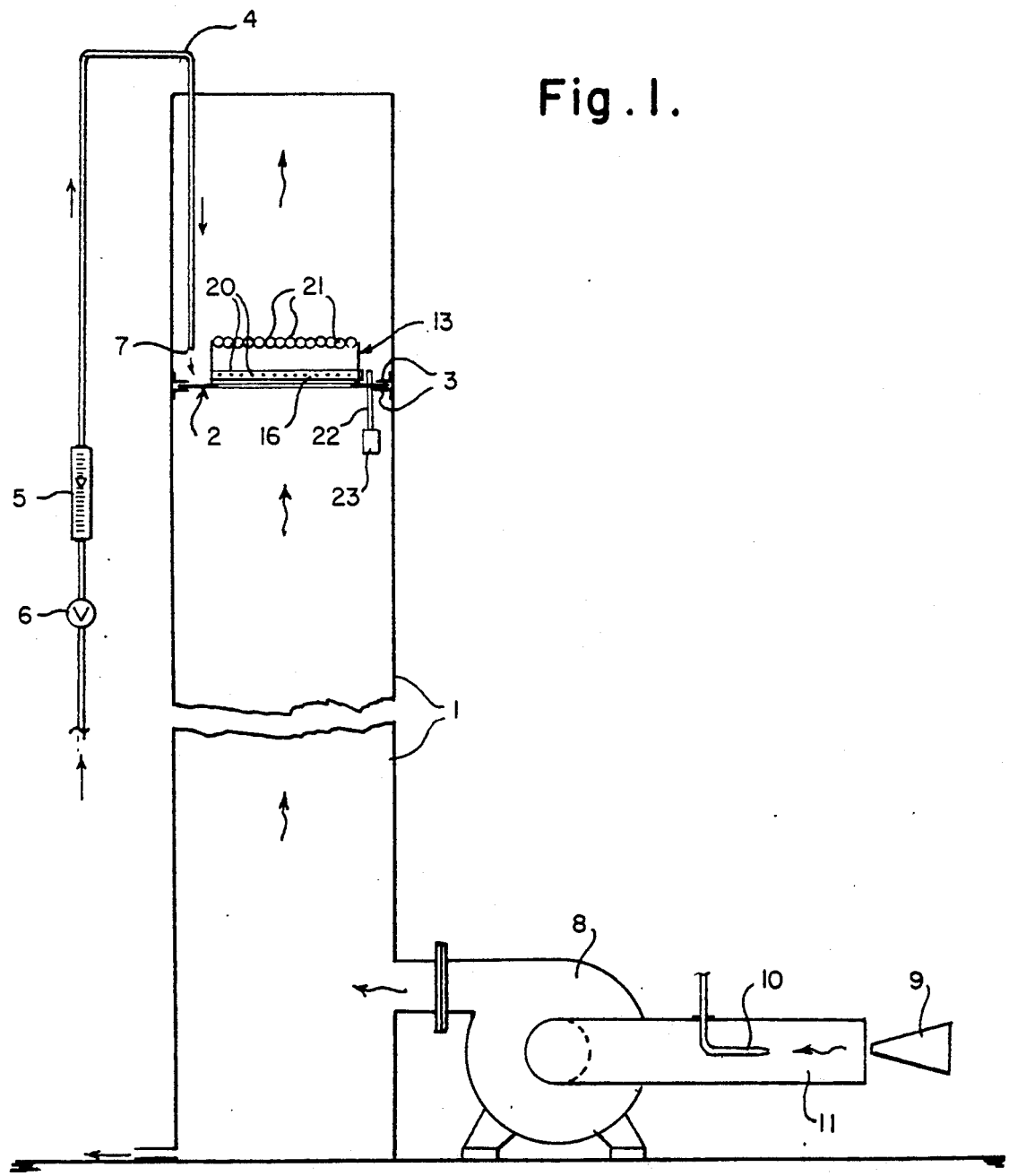
FIG. 1 is a diagrammatic elevation view of an embodiment of the invention with parts broken away to show details of the apparatus of invention.

With reference to FIG. 1, a scrubber-tower 1 encloses and supports a horizontal contact tray 2 held between flanges 3 of the tower 1. Water or other liquid is fed to the tray 2 through conduit 4 and through a flowmeter 5 and control valve 6 to a tray inlet feed point 7. Air or other gas is blown up through the tower by means of a centrifugal blower 8. The gas flow rate is controlled by means of a throttling damper g on the blower inlet and metered by means of a pitot tube 10 in suction flow duct 11.

Figure 2:
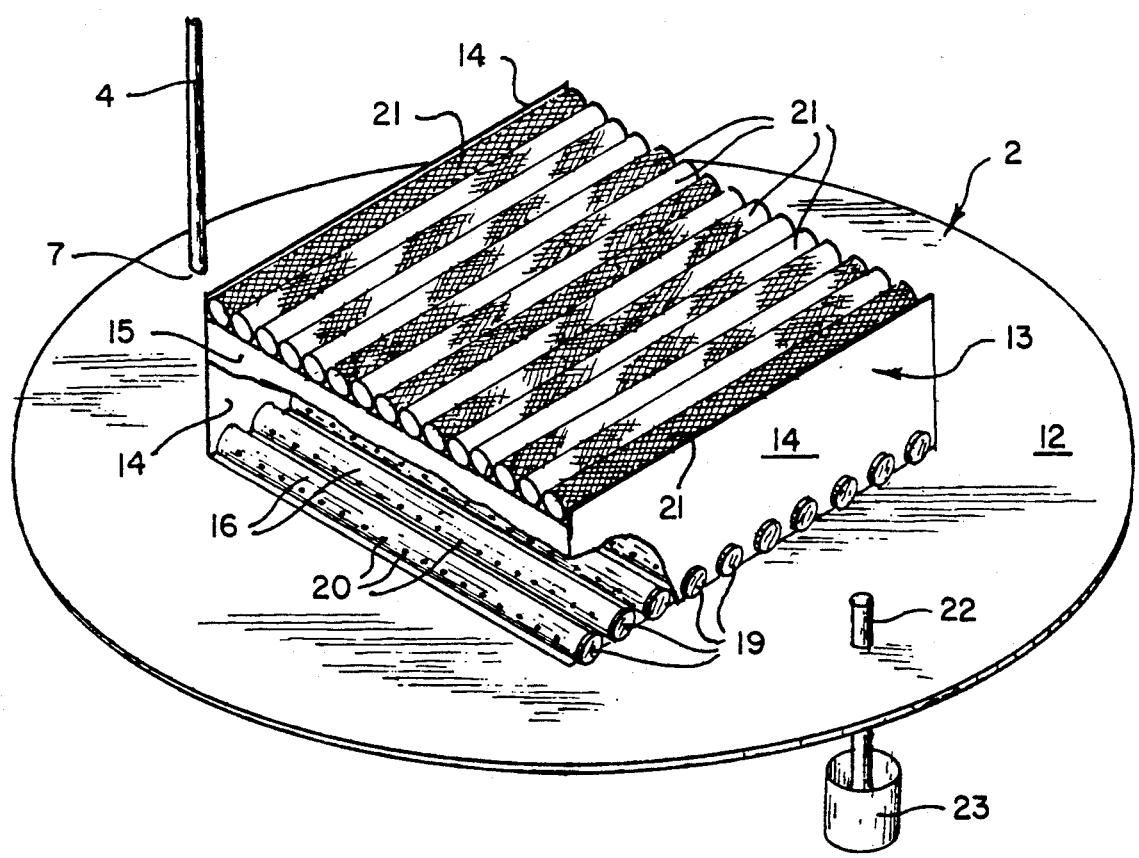
FIG. 2 is a view of the apparatus of this invention in which the method of this invention is practiced.

With reference to FIG. 2, the contact tray 2 consists of a circular plate 12 containing a vertically-walled rectangular housing 13 in open cross-section, one set of opposing sides 14 of housing being slightly higher than the other set of opposing sides 15.

A horizontal array of spaced-apart venturi tubes 16 are supported in opposing sides 14 with their bottom edges at, or slightly above, the surface of the tray floor 12. The liquid-conducting venturi tubes extend through the side walls 15 of the housing 13. The liquid-conducting venturi tubes 16 are plugged off on the downcomer side 19 so that liquid flowing off the tray floor can enter the tubes only from the side adjacent to the feed inlet point 7. Each of the venturi injection tubes 16 contains a row of holes 20 on each side, each row being horizontally disposed and evenly spaced 180 degrees apart, allowing liquid to be injected into the gas at right angles to the vertical gas upflow direction.

A single row per tray of open lattice-work foraminous tubes 21 are arranged in an array at the top of the open vertical housing 13 in a direction normal to the venturi injection tubes 16. Each end of the foraminous tubes 21 rests on the top edge of low sides 15 of the vertical housing 13. The contact box walls 14 on the two sides parallel to the length of the foraminous tubes 21 extend from the bottom of the tray floor 12 to slightly above the center of the row of foraminous tubes 21.

The foregoing arrangement directs the spray issuing from the foraminous, or spray recycle, tubes 21 at right angles to the general liquid crossflow direction across the tray. The tray floor 12 contains a single downcomer 22 consisting of an overflow cylindrical drain extending some inches, for example, 2 to 4 inches, both above and below the tray floor 12. The height of the downcomer pipe 22 above the tray floor provides a constant hydrostatic head for the venturi injection tubes 16. To provide a positive seal against gas entry, the downcomer is equipped with a seal cup 23 at the bottom. As shown in FIG. 2, the downcomer is preferably located 180 degrees from the liquid inlet.

SPECIFIC EXAMPLE

An 11½" i.d. acrylic tube was used as housing 1 so that the gas-liquid interaction could be visually observed. The contact tray 2 of this invention was held between flanges 3 of the acrylic housing. Water was fed to the tray through conduit 4 through a flowmeter 5 and control valve 6 to the tray inlet feed point 7.

Air was blown up through the housing 1 by means of a centrifugal blower 8. The air flow rate was controlled by means of a throttling damper 9 on the blower inlet and metered by means of a pitot tube 10 in a 4-inch diameter suction flow duct 11.

With reference to FIG. 2, the contact tray 2 was comprised of a circular plate 12 containing a vertically-walled square housing 13, 6 inches ×6 inches in open cross-section, 3¼" high on one set of opposing sides 14 and 4" on the other set of sides 15. The air velocity through the vertical square test section defined by housing 13 was calculated from the ratio of the respective air flow cross-sectional areas of the suction duct 11 and the said square test section.

Three (3) nominal 1" diameter polypropylene pipes 16 were used as the spaced-apart venturi injection tubes 8 with their bottom edges ¼" above the surface of the tray floor 4. The liquid-conducting venturi tubes 16 projected through the 4" side-walls of the housing 15. The liquid-conducting venturi tubes 16 were plugged off on the downcomer side 19 so that water flowing off the tray floor could enter the tubes only from the side adjacent to the inlet feed point 7. Each of the three venturi injection tubes contained ten (10) 3/32" holes 20 five on each side, horizontally disposed and evenly spaced 180° apart, allowing water to be injected into the gas at right angles to the vertical gas upflow direction.

A single row of five (5) 1⅜" diameter, 6½" long, extruded, open-latticework, polypropylene tubes 21, commercially available under the name of "Vexar" tubing, were arranged in a contiguous array at the top of the open vertical housing 16 in a direction normal to the venturi injection tubes. The bottoms of the Vexar tubes 21 were in tangent contact with the 3¼" high sides 14 of the vertical housing normal to the length of the perforated tubes. The contact box walls 15 on the two sides parallel to the length of the Vexar tubes extended 4 inches above the bottom of the tray floor 12 and slightly above the center of the row of the Vexar tubes 21. This arrangement directed the recycle liquid issuing from the spray recycle tubes at right angles to the general liquid crossflow direction across the tray. The tray floor 12 contained a single downcomer 22 comprising an overflow 1" diameter cylindrical drain, extending 2¼" above the floor of the tray 12 and 3 inches below the tray. The height of the overflow (downcomer) pipe 22 above the tray floor was 2¼", thus providing a constant hydrostatic head for the venturi injection tubes 16. To provide a positive seal against gas entry, the downcomer was equipped with a seal cup 23 at the bottom. The downcomer was located 180° from the water inlet.

Average liquid residence times on the tray were measured by injecting four (4) drops of green food coloring dye into the water inlet 7 over a period of 16 seconds, and then timing the interval for the color to visually disappear from the liquid in the region of the tray downcomer 22. Two sets of comparative retention time runs were made: (a) with air flow and venturi tube/foraminous tube liquid spray recycle at a liquid throughput rate of 0.5 GPM, and (b) with no air flow and a 0.5 GPM liquid throughput, but with the venturi tube entrances plugged. Four dye disappearance time tests were made at each of the two conditions (a) and (b), and the times were averaged to obtain a mean.

The reference runs, made with 0.5 GPM liquid flow across the tray, but with no air flow, and with the liquid-conducting venturi tube liquid entries plugged, gave an average dye disappearance time of 98 seconds. A theoretical liquid residence time, assuming plug flow and no mixing, was derived from measurement of the volume of liquid on the tray external to the 6"×6" venturi/spray recycle box. The water depth at 0.5 GPM liquid flow at condition (b) zero gas rate, with the venturi tubes plugged, was measured as 2-5/16". The volume of the liquid retained on the tray was calculated from this depth as 0.647 gallons. Dividing this value by the 0.5 GPM flow rate gave a theoretical no-mixing residence time of 78 seconds. The experimentally-measured reference dye residence time of 98 seconds was therefore only 20 seconds longer than the plug-flow residence time.

With air flowing through the open 6"×6" square section at a velocity of 715 feet per minute, at a gas pressure drop through the contact stage of 1.3 inches water column, the average time for dye disappearance was 286 seconds. This value was 3.46 times the theoretical plug-flow time and 2.88 times the measured dye residence time without recycle. The spray recycle rate was therefore 2.9 times the liquid throughput rate. Inasmuch as the liquid throughput rate was 0.5 GPM, the measured 2.9 recycle ratio meant that the spray recycle rate was 1.44 GPM. The 6"×6" gas flow cross-sectional area was 0.25 square feet, so that the spray recycle rate was 5.76 GPM/square foot, which is an impressively high value. It should be noted that this area flow rate is typical of throughput rates for packed tower contactors, but in the case of the present invention, this rate is a liquid drop spray rate, and the liquid drops have an intrinsically greater contact area than the falling film of the packed tower.

The spray recycle rate is a function of the liquid injection rate from the liquid-conducting venturi tubes and of the gas velocity. The injection rate of liquid from the liquid conductor tubes can be controlled by the size and number of the injection orifices or overflow weirs, and their number and location in the initial design. In one modification of this invention, the spray recycle rate can be made independent of the tray or column liquid throughput rate by providing a fixed hydrostatic head on the bottom liquid conductors by means of an overflow tube. High ratios of recycle spray rates to liquid throughput rates are of particular advantage in instances where a long residence time under efficient contacting conditions per unit liquid throughput is required. An example of this type of application is the stripping of partially soluble organic compounds, such as phenol or tert-methyl butyl ether, from contaminated groundwater.

Another mode of operation of the method of this invention can be employed when it is desired to make the liquid injection rate into the gas a function of the liquid throughput rate. This mode of operation can be achieved by sizing the plate overflow tubes so that they are submerged under a head of liquid over the liquid throughput range of interest. The submergence of the top of the tray overflow tubes, that is, the hydrostatic head on the liquid conductor tubes, and therefore the rate of liquid injection into the gas, will then be proportional to the liquid throughput rate. This mode of operation is preferred where it is desired to keep recycle spray rates proportional to throughput, so that a substantially constant efficiency is obtained over a varying liquid throughput range. Such a characteristic, known to the art as "wide turndown ratio" is highly desirable in most distillation and absorption applications.

The apparatus of this invention provides for a cyclic method of spray generation, collection, and direction in a controlled manner. Modifications of the method of invention, described above, can effect selected variation in liquid recycle ratio, recycle loop retention time, and liquid recycle direction on the contact tray. The ready achievement of non-random spray recycle rates at high ratios to tray liquid throughput shown by the test results indicates the utility and potential of the apparatus and method of invention.

The allowable gas velocity of conventional sieve or bubble cap tray units is typically in the 50–200 fpm air equivalent linear velocity range. As indicated by the linear gas velocity of 715 fpm in the Specific Example, the velocity range in the method of this invention in employing the contactor tray of the invention is very much greater than that of conventional mass transfer methods. The gas treatment capacity for a given flow cross-section of the apparatus of this invention is accordingly several hundred percent greater than for conventional liquid-gas contact apparatus. Further, the pressure drop of 1.3 inches W.C. at the 715 fpm linear air velocity in the test apparatus of this invention demonstrates a comparatively low pressure drop characteristic for the apparatus of this invention at high linear gas velocities. This low energy demand for the gas flow derives from the absence of a hydrostatic liquid head resisting as flow in the apparatus of this invention, compared to the existence of such hydrostatic heads in conventional bubble cap and sieve tray contactors. The spray recycle ratio is a function of the gas velocity; the recycle ratio and the generation of new interfacial contact area increase as the gas velocity increases, thus maintaining or increasing the mass transfer efficiency of the apparatus of invention with increasing gas flow.

I claim:

1. Gas-liquid contact apparatus consisting of a vertically disposed vessel containing at least one horizontal tray, means for introducing liquid to, and removing overflow from, the tray, and at least one vertically arranged housing thereon open to gas flow at top and bottom enclosing a horizontally disposed array of liquid conductors in substantially parallel arrangement so spaced apart as to effect constricted venturi passages for the upward flow of gas therebetween, said conductors having means for delivery therefrom of liquid from the said tray into the gas thereby effecting formation of an upward spray of liquid by the gas; and, disposed above said liquid conductors and supported on said housing, a horizontal array of parallel foraminous tubes in substantial linear contact with each other, each tube having at least one open end within which tubes the spray flows to the space outside the housing and against the inner wall of the said vessel whereby the liquid separated from the spray flows into said liquid conductors, and is recycled into contact with the continuously introduced gas.

2. The apparatus of claim 1 in which each array of conductors consists of tubes having orifices disposed lengthwise along the sides of each tube so as to inject liquid into the upward flow of gas between the tubes.

3. The apparatus of claim 1 in which the said foraminous tubes consist of a synthetic resin shaped so as to constitute a cylindrical lattice of interstices for passage of spray therethrough.

4. The apparatus of claim 3 in which the said liquid conductors consist of tubes having orifices disposed lengthwise along the sides of the tubes, the said spacing of the tubes being such as to effect a venturi restriction of the flow of gas upward between the tubes and an aspiration of liquid flowing from the tubes into a spray of liquid and the said gas.

5. The apparatus of claim 1 in which one end of each foraminous tube is open and the other is closed.

6. The apparatus of claim 5 in which the open end of each said tube is at the end opposite to that of each adjacent tube.

7. The apparatus of claim 5 in which said open ends of the foraminous tubes are adjacent to each other.

8. The apparatus of claim 7 in which the liquid overflow means is located in each horizontal tray at the opposite end of the open ends of the foraminous tubes.

9. The apparatus of claim 1 in which each horizontal tray is provided with means situated outside of said vertical housing for feeding liquid to the tray and for overflowing liquid from the tray.

10. The apparatus of claim 9 in which the said foraminous tubes are open at both ends and the said means for feeding liquid to the tray and for overflowing liquid therefrom are located at opposite sides of said vertical housing on a line normal to the alignment of the said horizontal ar-,ray of foraminous tubes.

11. The apparatus of claim 1 in which the vertically disposed vessel contains a number of the said horizontal trays, one above the other, each having a vertical housing enclosing at the level of the tray the said liquid conductors and, supported on each vertical housing, the said foraminous tubes open at at least one end, the said tubes extending normal to the said liquid conductors, and means for feeding liquid to each tray and removing overflow liquid from each tray.

12. The apparatus of claim 11 in which all foraminous tubes of one said array are open at one and the same end and said means for removing overflow liquid comprises at least one downcomer located in the horizontal tray at between 90 and 180 degrees from the vertical plane defined by the said open ends of the foraminous tubes.

13. Apparatus for effecting gas-liquid mass transfer comprising a vertically oriented gas-tight vessel having at the base thereof means for passage of a gas into the vessel and at its top means for passage of a gas therefrom, at least one horizontal tray contained therein, a vertical housing resting on each said tray, an array contained within the housing and occupying an open space in the tray of horizontally aligned spaced apart parallel elongated liquid conductors having liquid-delivery openings to the space between the conductors, said conductors being open to liquid flow from the surrounding tray outside the housing, and, supported upon the upper edges of said housing, an array of foraminous tubes in substantial parallel contact with each other, each said tube being open at at least one end thereof for liquid flow from the tubes; and means for flow of liquid into substantially the top of the said vessel and for flow of treated liquid from substantially the bottom of the vessel.

* * * * *